United States Patent [19]
Ogasawara et al.

[11] Patent Number: 5,905,603
[45] Date of Patent: *May 18, 1999

[54] MAGNETIC RECORDING MEDIUM MAGNETIC HEAD POSITIONING METHOD, AND MAGNETIC RECORDING APPARATUS

[75] Inventors: Kenji Ogasawara, Kanagawa-ken; Hiroshi Yanagisawa, Kamakura; Koji Kurachi, Yokohama, all of Japan

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/510,173

[22] Filed: Aug. 2, 1995

[30] Foreign Application Priority Data

Sep. 27, 1994 [JP] Japan .................................. 6-3058757

[51] Int. Cl.$^6$ .................................................. G11B 5/596
[52] U.S. Cl. .......................................... 360/77.08; 360/48
[58] Field of Search ............................. 360/77.08, 77.07, 360/77.02, 135, 48, 51, 49, 78.14, 113

[56] References Cited

U.S. PATENT DOCUMENTS

| | | | |
|---|---|---|---|
| 4,783,705 | 11/1988 | Moon et al. | 360/77.08 |
| 5,164,866 | 11/1992 | Sano | 360/77.08 |
| 5,353,170 | 10/1994 | Tung | 360/77.13 |
| 5,523,902 | 6/1996 | Pederson | 360/77.08 |

*Primary Examiner*—Aristotelis M. Psitos
*Assistant Examiner*—James L. Habermehl
*Attorney, Agent, or Firm*—Merchant, Gould, S ith, Edell, Welter & Schmidt, P.A.

[57] ABSTRACT

A method and apparatus for accurately positioning the magnetic head of disk drives is disclosed. A recording medium is provided having two radial data structures formed thereon. Each radial data structure includes two parallel and adjacent data burst pattern trains. The first burst pattern is defined by a first side centrally aligned with a concentric data track and a second side opposed to the first side and centrally aligned with an adjacent concentric data track. The third burst pattern is defined by a third side spaced apart from the first side of the first burst pattern by a distance not greater than the read width of a magnetic head and a fourth side opposed to the third side and spaced apart from the second side by a distance not greater than the read width. The first radial data structure generates a first signal for positioning the magnetic head relative to the recording medium. The second radial data structure, parallel and offset from the first data structure, generates a second head position signal. Thus, the second head position signal is detected before the first head position signal becomes undetectable.

29 Claims, 7 Drawing Sheets

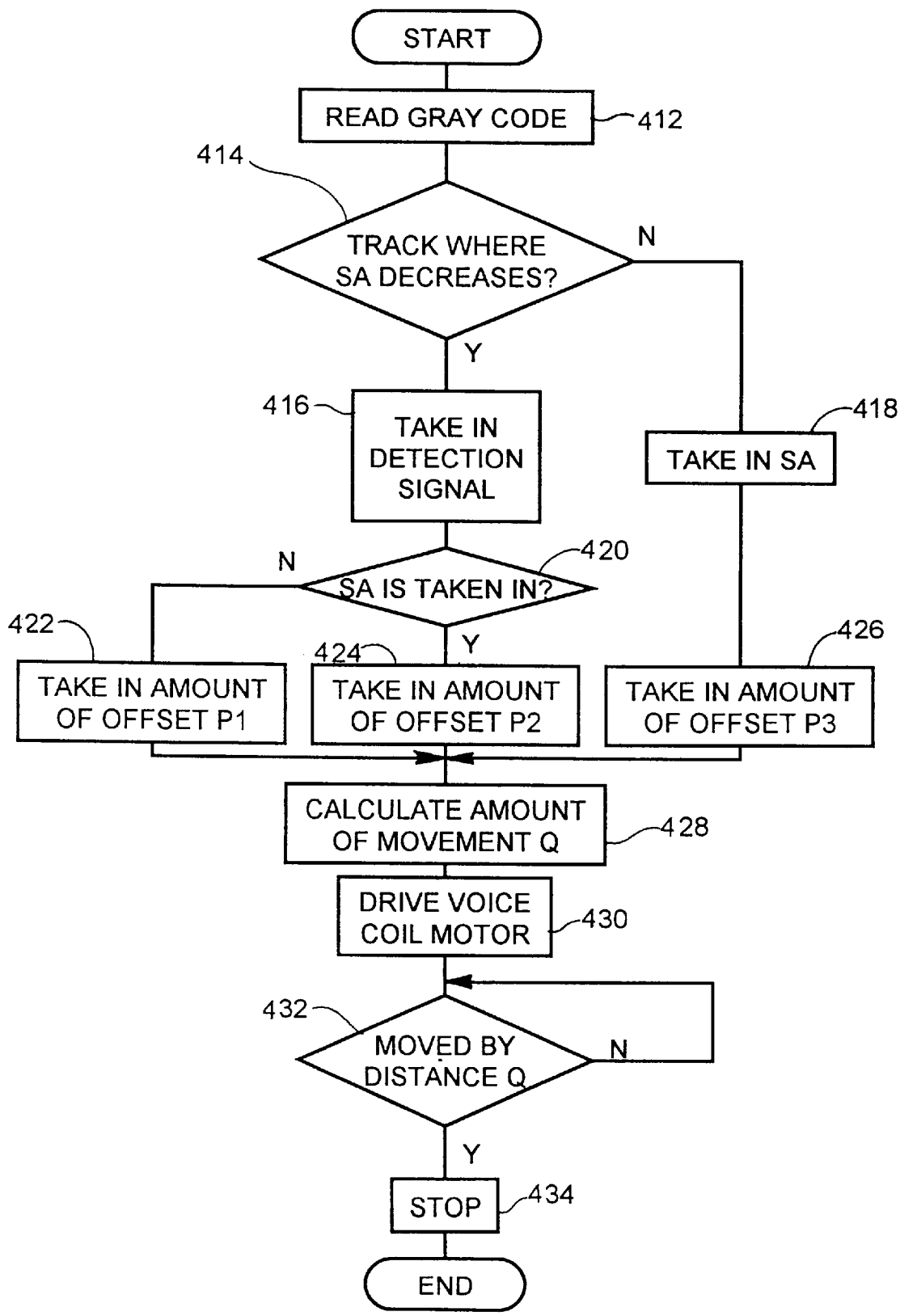

MAGNETIC RECORDING MEDIUM MAGNETIC HEAD POSITIONING METHOD, AND MAGNETIC RECORDING APPARATUS

BACKGROUND OF THE INVENTION

1. Field of the Invention

This invention relates in general to a method and apparatus for accurately positioning the magnetic write/read head of a disk drive, and more particularly, to a method and apparatus for accruately positioning write/read heads which provide a write gap and a shorter read gap relative to a recording medium having concentric data tracks and radial burst patterns recorded thereon for determining the position of the heads, wherein a second position signal is detected before a first position signal is discontinued.

2. Description of Related Art

On a magnetic disk such as a hard disk or a flexible disk, a plurality of data tracks is concentrically formed. When information is read from or written to the magnetic disk, the magnetic head is moved in the radial direction of the magnetic disk to face a specific data track (a so-called seek operation), and thereafter an information reading or writing operation is performed with respect to the specific data track.

The positioning of the magnetic head for causing the magnetic head to face the specific data track is performed by reading a burst pattern continuously recorded in the radial direction of the magnetic disk. For example, FIG. 9 (*a*) illustrates a typical burst pattern recorded on a magnetic disk.

In FIG. 9 (*a*), the magnetic disk rotates in the circumferential direction of the magnetic disk (the direction of arrow A in FIG. 9), and a magnetic head (not shown) moves in the radial direction of the magnetic head (the direction of arrow B or the opposite direction in FIG. 9). On the magnetic disk, a plurality of data tracks on which data is recorded 54N (N is a positive integer), 54N±1, 54N±2, 54N±3, . . . , are concentrically formed, and a burst pattern 902 is recorded in the radial direction of the magnetic disk. The burst pattern 902 consists of a first burst pattern train 910 formed by arranging in the radial direction regions 912 in which data is recorded, a second burst pattern train 920 similarly formed by arranging in the radial direction regions 922 in which data is recorded, a third burst pattern train 930 similarly formed by arranging in the radial direction regions 932 in which data is recorded, and a fourth burst pattern train 940 similarly formed by arranging in the radial direction regions 942 in which a signal is recorded.

The size of each region constituting the burst pattern trains 910 and 920 in the radial direction of the magnetic disk is made to equal to the pitch (P) 960 of the data tracks, and these regions are staggered in the radial direction of the magnetic disk so that both edge sections thereof in the radial direction coincide with the central position of each of the data tracks. Also, the size of each region constituting the burst pattern trains 930 and 940 in the radial direction of the magnetic disk is made to equal the pitch (P) 960 of the data tracks, and these regions are staggered in the radial direction of the magnetic disk so that both edge sections thereof in the radial direction coincide with the central position between the respective data tracks.

If the burst pattern is read while the magnetic head is moved in the radial direction of the magnetic disk, a position detection signal is obtained. The position detection signal includes two types of signals. A first composite signal A/(A+B) is obtained by dividing the signal obtained by reading the first burst pattern train 910 (hereinafter referred to as signal A) by the signal obtained by adding to the signal A, a signal obtained by reading the second burst pattern train 920 (hereinafter referred to as signal B), and a second composite signal D/(C+D) which is obtained by dividing the signal obtained by reading the fourth burst pattern train 940 (hereinafter referred to as signal D) by the signal obtained by adding to signal 940, a signal obtained by reading the third burst pattern train 930 (hereinafter referred to as signal C).

The position detection signal A/(A+B) changes linearly when the gap center passes near the center of the data track 54N in the width direction thereof (the direction of arrow B in FIG. 9). Incidentally, the position detection signal A/(A+B) also changes similarly when the gap center passes the center of other data tracks 54N+1, 54+2, 54N+3, . . . in the width direction thereof. Also, the position detection signal D/(C+D) changes linearly when the gap center passes near the center between the data track 54N and 54N+1. In addition, the position detection signal D/(C+D) also changes similarly when the gap center passes near the center between other data tracks 54N+1, 54N+2, 54N+3, . . . .

Accordingly, based on the levels of the position detection signals A/(A+B) and D/(C+D), the position of the gap, namely, the position of the magnetic head can be determined and, based on the levels of the position detection signals, the magnetic head can be positioned so that the gap center is positioned at the center of the width of the data track. Thus, before the position of the magnetic head reaches the data track 54N+1 from the data track 54N, the position detection signal A/(A+B) is switched to the position detection signal D/(C+D) so that the position signal is not discontinued and the magnetic head can be positioned based on the position detection signal level.

More recently, magnetic heads have been proposed which read information using a magnetoresistance element (hereinafter referred to as an MR element). The MR element is an element which utilizes the magnetoresistance effect. Thus, if a semiconductor is placed in a magnetic field, the direction in which the electrons or positive holes in the semiconductor advance is changed by the magnetic field, whereby the traveling path becomes longer and the resistance value increases. In the magnetic head which uses the MR element to read information and uses a coil to write information, there are provided separately a read gap and a write gap. However, the longitudinal size of the read gap is shorter than the write gap. Accordingly, data is written wide and read narrow to decrease the crosstalk from other data tracks, thereby obtaining a position detection signal having a small S/N ratio. Thus, the recording density may be increased.

However, when the longitudinal size of the read gap is shortened and the read range is shortened as described above, a region 970 occurs in which the position detection signals A/(A+B) and D/(C+D) cannot be detected, as shown in FIG. 9 (*b*). If such a region 970 occurs, the position at which the magnetic head is currently located cannot be determined, and the magnetic head cannot be positioned.

In FIG. 9 (*b*), the abscissa represents the position of the magnetic head and, more specifically, the longitudinal center position (center) of the gap formed in the magnetic head.

If, on the one hand, the read range is widened to solve such problem, the primary object, writing data wide and reading it narrow to increase the recording density, cannot be accomplished.

On the other hand, as disclosed in PUPA No. 4-353679 official gazette, a burst pattern consisting of four special burst pattern trains formed by the respective regions having their length in the radial direction of the magnetic disk made shorter than the pitch of data tracks is prerecorded on the magnetic disk to solve the above problem. From a total of eight signals obtained by calculating the four signals obtained from the burst pattern, a single signal to be used as the position detection signal is switched according to the magnetic head position, thereby obtaining a position detection signal which changes linearly over a wide range of movement for the magnetic head.

Nevertheless, in the above approach the determination of signal switching and processes such as the calculation for obtaining a position detection signal is cumbersome. Further, the above approach requires the recording of a special burst pattern on the magnetic disk, in which special burst pattern the length of the respective regions in the radial direction of the magnetic disk is shorter than the pitch of the data tracks. Thus there is a problem in that labor and time must be taken to record the burst pattern. In addition, the above official gazette discloses that the addition or subtraction of a predetermined bias value with relation to the obtained signal can provide a position detection signal which changes linearly for movement of the magnetic head. However, the offset changes according to the voltage supplied to the magnetic head or the ambient temperature and, thus, even if a fixed value is given as the bias value, an unnatural section, or a so-called point of inflection, occurs in the position signal at a point where the signal used as the position detection signal is switched.

It can be seen then that there is a need for a magnetic head positioning method and apparatus wherein the positioning of the write magnetic head and the read magnetic head can be performed reliably.

It can also be seen that there is a need for a magnetic head positioning method and apparatus wherein data is written wide and read narrow to decrease the crosstalk from other data tracks, but gaps between regions which generate position detection signals are prevented.

SUMMARY OF THE INVENTION

To overcome the limitations in the prior art described above, and to overcome other limitations that will become apparent upon reading and understanding the present specification, the present invention discloses a method and apparatus for accurately positioning the magnetic write and read heads of a disk drive.

The present invention solves the above-described problems by providing a magnetic recording medium having formed thereon in a predetermined direction a plurality of data tracks to which data is written by the write section of a magnetic head including a write section of a predetermined write width and a read section of a read width shorter than the write width. During operation, either the head moves relative to the recording medium or vice versa.

A system in accordance with the principles of the present invention comprises a magnetic recording medium having recorded thereon a first burst pattern formed by arranging in the predetermined direction a plurality of record sections which are formed by recording data in every other one of the regions defined by a first side disposed so as to correspond to the vicinity of the center of the data track and a second side opposed to the first side and disposed so as to correspond to the vicinity of the center of the data tracks adjacent to the data track.

A second burst pattern is also formed by arranging in the predetermined direction a plurality of record sections which are formed by recording data in the regions corresponding to those of the first burst pattern in which no data is recorded. The second burst pattern is further disposed in parallel with the first burst pattern.

Next, a third burst pattern is formed by arranging in the predetermined direction a plurality of record sections which are formed by recording data in every other one of the regions defined by a third side spaced apart from the first side of the first burst pattern by a distance not greater than the read width and a fourth side opposed to the third side and spaced apart from the second side by a distance not greater than the read width. The third burst pattern is also disposed in parallel with the first burst pattern.

Finally, a fourth burst pattern is formed by arranging in the predetermined direction a plurality of record sections which are formed by recording data in the regions corresponding to those of the third burst pattern in which no data is recorded. Again, the fourth burst pattern is disposed in parallel with the first burst pattern. The magnetic head is positioned at the desired location based on a signal which is output from the magnetic head correspondingly to at least either the first and second burst patterns or the third and fourth burst patterns.

The invention is characterized by moving relatively in a predetermined direction at least either a magnetic head having a write section of a predetermined write width and a read section of a read width shorter than the write width, or a magnetic recording medium. Further, the first and second burst patterns combine to form a first radial data structure which is used to generate a first signal for positioning the magnetic head relative to the recording medium. The third and fourth burst patterns combine to form a second radial data structure, parallel and offset from the first data structure, for generating a second head position signal. The second head position signal is detected before the first head position signal becomes undetectable.

One aspect of the present invention is that the magnetic head is positioned at the desired location based on a signal which is output from the magnetic head correspondingly to at least either the first and second burst patterns or the third and fourth burst patterns.

Another aspect of the present invention is that a movement means is provided for moving relatively at least either the magnetic head or the magnetic recording medium along in predetermined direction.

Another aspect of the present invention is that a positioning means is provided for positioning the magnetic head at the desired location based on a signal which is output from the magnetic head corresponding to at least either the first and second burst patterns or the third and fourth burst patterns.

Yet another aspect of the present invention is that either the magnetic head or the magnetic recording medium moves relatively in the predetermined direction by the movement means.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout:

FIG. 7 is a flowchart showing the subroutine for positioning control of the present embodiment;

FIG. 8($b$) is a diagram showing the relationship of the signal level of the position detection signal SA vs. the amount of offset of the read gap of the magnetic head from the center of the data tracks in which the position detection signal SA decreases;

FIG. 8($c$) is a diagram showing the relationship of the signal level of the position detection signal SA vs. the amount of offset of the read gap of the magnetic head from the center of the data tracks in which the position detection signal SA increases.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Figure 1:
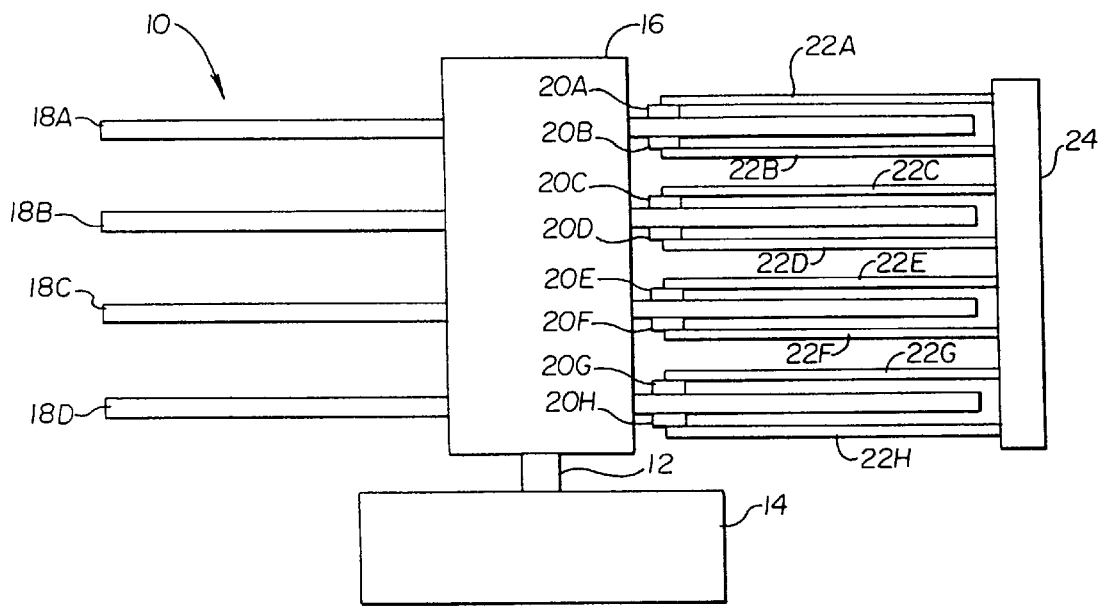
FIG. 1 is a a schematic diagram of the hard disk device related to the present embodiment.

FIG. 1 illustrates an exemplary hard disk drive system 10 according to the present invention. The hard disk device 10 includes a driving device 14 for rotating a shaft 12 at high speed. To the shaft 12, a cylindrical support 16 is attached so that their axes coincide and, on the outer periphery of the support 16, disks 18A, 18B, 18C and 18D, as a plurality of (in FIG. 1, four) magnetic recording media are installed at a predetermined interval, respectively.

The disks 18A to 18D are of a disk having a predetermined thickness, and each made of a hard material and coated with a magnetic material on both surfaces thereof, which form the recording surfaces. In the central section of the disks 18A to 18D, a hole having a diameter substantially the same as the outer diameter size of the support 16 is made. The support 16 is inserted into the hole, and the disks 18A to 18D are fixed to the outer periphery of the support 16. In consequence, the disks 18A to 18D are rotated integrally with the support 16 when the shaft 12 is rotated by the driving device 14.

Figure 2:
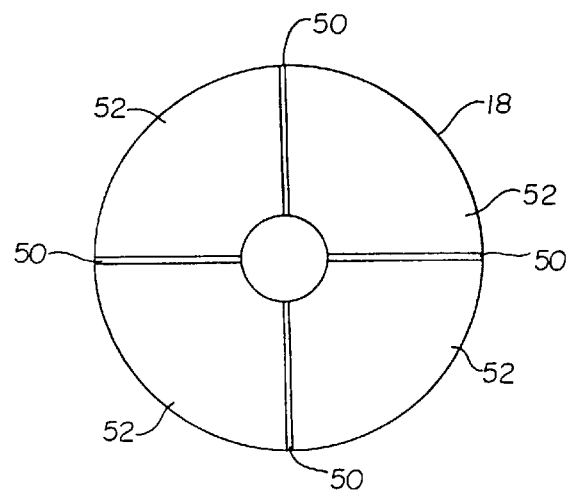
FIG. 2 is a plan view of the disk showing the burst pattern recording regions.

Referring now to FIG. 2, a plurality of burst pattern recording regions 50 are radially formed in the radial direction on the recording surfaces of each of the disks 18A to 18D and the remaining regions form data track regions 52. In the burst pattern recording regions 50, data is recorded in a predetermined pattern to form a burst pattern.

Figure 3:
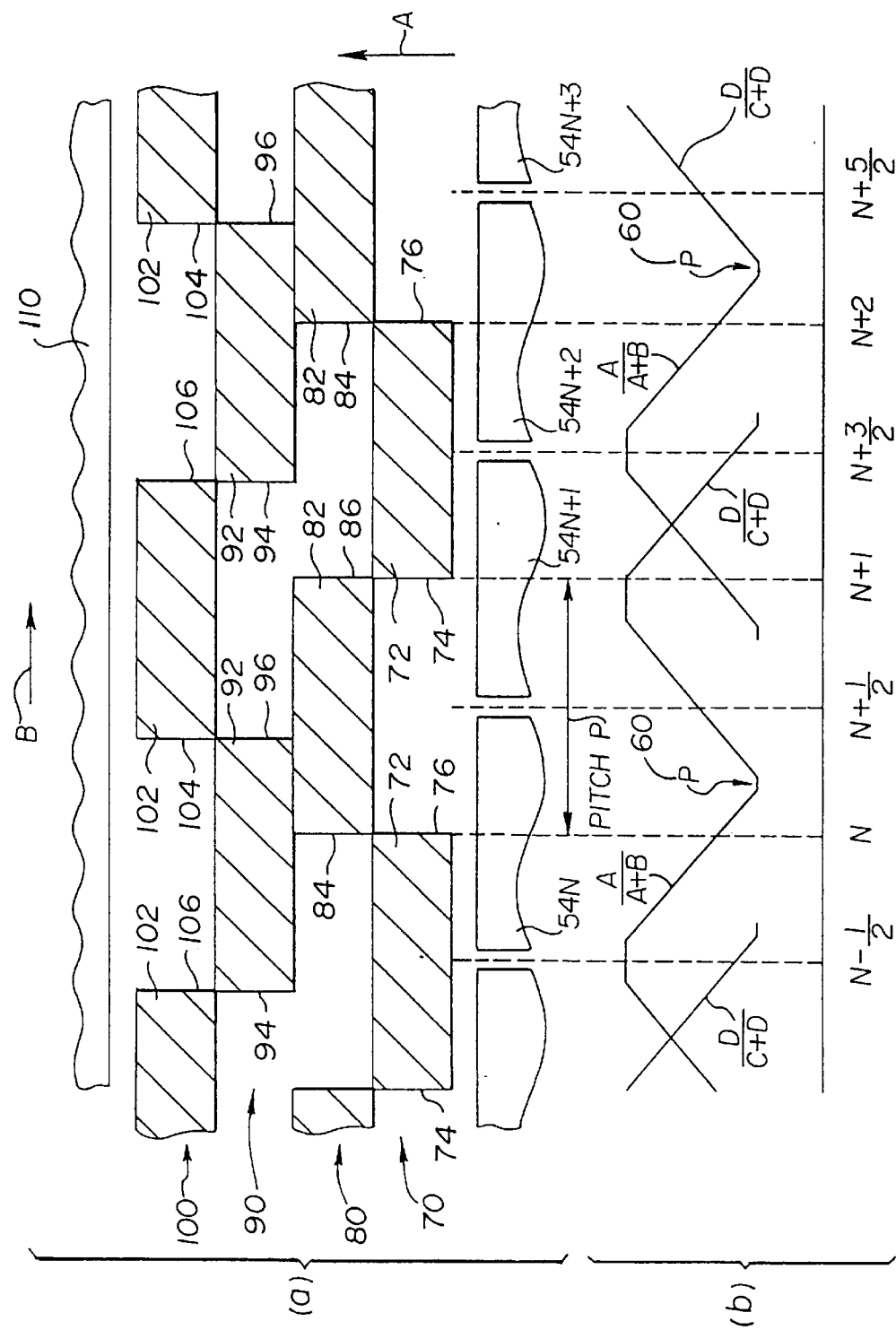
FIG. 3 is a plan view showing the burst pattern and the signals output from the magnetic head when the burst pattern is read while the magnetic head is being moved.

Now referring to FIG. 3, a part of the burst pattern is shown formed in the burst pattern region 50 and the data track region 52. In the data track region 52, a plurality of data tracks is concentrically formed at a pitch P 60 in the radial direction (the direction of arrow B in FIG. 3) and, data tracks 54N (N: a positive integer), 54N±1, 54N±2, 54N±3, are shown. To each data track, data is written in the rotational direction of the disk 18 (the direction of arrow A in FIG. 3) by a magnetic head to be described later.

The burst pattern formed in the burst pattern recording regions 50 consists of four burst pattern trains (burst pattern trains A to D) which are respectively formed by arranging the regions having data recorded region (the hatched regions) in the radial direction of the disk 18, as shown. Each data recording region constituting each burst pattern train has a length in the radial direction of the magnetic disk 18 and a spacing between the adjacent regions, which are equal to the pitch P 60 of the data track 54, respectively.

The burst pattern train A constructs the first burst pattern of the present invention. The burst pattern train 70 is formed by arranging in the radial direction of the disk 18 a plurality of record sections which are formed by recording data in regions 72 defined by a side 74 as the first side of the present invention which is disposed so as to be positioned at the center of the data tracks 54N±1, 54N±3, 54N±5, . . . in the radial direction of the disk 18. The second side 76 of the present invention is opposed to the side 74 and disposed so as to correspond to the vicinity of the center of data tracks 54N, 54N±2, 54N±4, . . . in the radial direction of the disk 18.

The burst pattern train 80 constructs the second burst pattern of the present invention. The burst pattern train B is formed by arranging in the radial direction of the disk 18 a plurality of record sections 82 which are formed by recording data in the regions corresponding to those of the burst pattern train 70 in which no data is recorded.

The burst pattern train 90 constructs the third burst pattern of the present invention. The burst pattern train 90 is formed by arranging in the radial direction of the disk 18 a plurality of record sections which are formed by recording data in regions 92 defined by a side 94 as the third side of the present invention which is spaced apart from the side 74 of the burst pattern train 70 by a distance rather shorter than the read width of the read gap 20A as the read section of the magnetic head 20. The fourth side 96 of the present invention is opposed to the side 94 and spaced apart from the side 76 by a distance rather shorter than the read width of the read gap 20A.

The burst pattern train 100 constructs the fourth burst pattern of the present invention. The burst pattern train 100 is formed by arranging in the radial direction of the disk 18 a plurality of record sections 102 which are formed by recording data in the regions corresponding to those of the burst pattern train 90 in which no data is recorded.

In the present embodiment, the signal recording regions 72 and 92 are disposed so as to overlap the signal recording regions 82 and 102 by an amount of three-fifths in the direction of rotation of the disk 18, respectively. In addition, the burst pattern trains 70, 80, 90 and 100 are disposed in parallel with each other.

In a region 110 contained in the burst pattern recording region 50, a special code (e.g., a silent region of about one microsecond) representing the start of the pattern and a gray code (cyclic binary code) representing the address of each data track are recorded so as to correspond to the data track.

Figure 4:
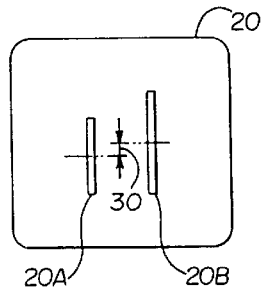
FIG. 4 is a plan view showing the read gap and the write gap formed in the magnetic head.

Further, the hard disk device 10 includes magnetic heads 20A to 20H provided so as to correspond to the recording surfaces of each of the disks 18A to 18D. In each of the magnetic heads 20A to 20H, a read gap 20A as the read section for reading data and a write gap 20B as the write section for writing data are formed. Each section extends in the width direction of each data track as shown in FIG. 4. The longitudinal size of the read gap 20A is made shorter as compared to the write gap 20B. As a result, the read width of the read gap 20A is shorter than the write width of the write gap 20B. In addition, the longitudinal center of the read gap 20A is offset 30 from the center of the write gap 20B in the radial direction of the disk 18 (the direction of arrow B in FIG. 3).

Each magnetic head 20 comprises a read element (not shown) which reads information using a MR element provided so as to correspond to the read gap 20A, and a write element (not shown) which writes information by means of a coil provided so as to correspond to the write gap 20B. The magnetic heads 20A to 20H are installed on the distal end of access arms 22A to 22H, respectively, and held at a position a little apart (e.g., 0.1 to 0.2 microns) from the corresponding recording surfaces of the disks 18A to 18D. The end section of the access arms 22A to 22H opposite the side on which the magnetic head 20 is installed is attached to a driving device 24.

Figure 5:
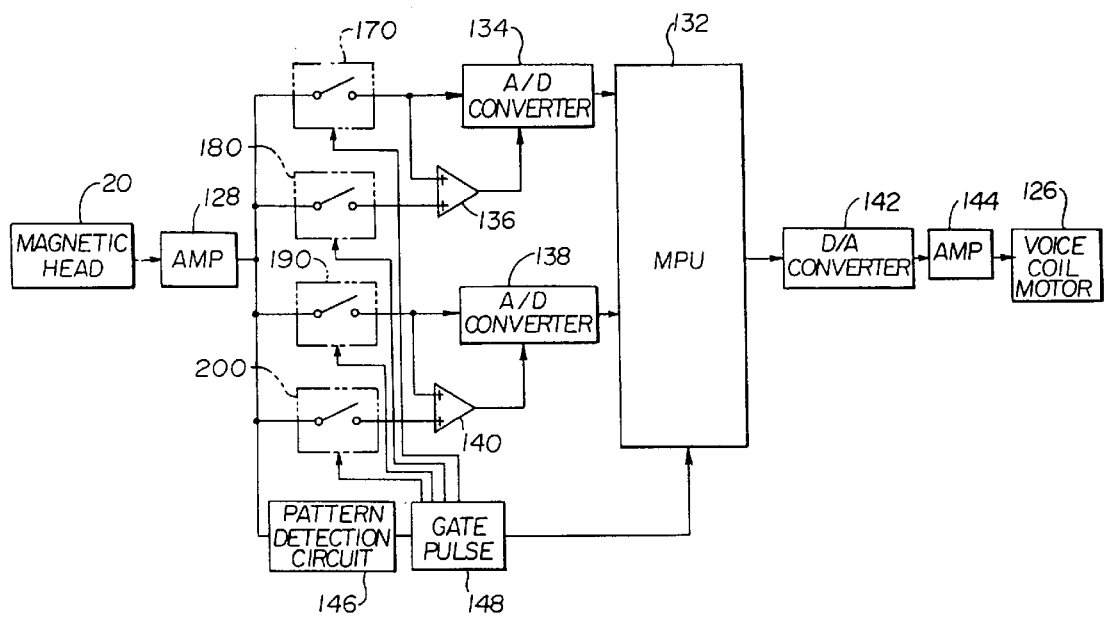
FIG. 5 is a schematic block diagram showing the connection relationship between the MPU of the hard disk device, the magnetic head, and the surrounding.

Now referring to FIG. 5, the driving device 124 includes voice coil motors 126 provided so as to correspond to the access arms 22A to 22H for moving the individual arms. When the voice coil motors 126 are driven by a microprocessing unit to be described later, the voice coil motors 126 cause the access arms to move so that the magnetic heads 20A to 20H move in the radial direction of the disks 18A to 18D. This causes the magnetic heads 20A to 20H to face a predetermined section on the recording surfaces of the disks 18A to 18D.

The magnetic heads are connected to a circuit as shown in FIG. 5, respectively. That is, the signal output terminal of the magnetic head 20 is connected to the input terminal of an amplifier 128, and the signal output from the read element of the magnetic head 20 is amplified in the amplifier 128. One terminal of the switching circuits 170, 180, 190 and 200 is connected in parallel to the output terminal of the amplifier 128. Further, the output terminal of the amplifier 128 is connected to a gate pulse generator 148 through a pattern detection circuit 146. The gate pulse generator 148 is connected to the switching circuits 170, 180, 190 and 200, and a microprocessing unit (hereinafter referred to as an MPU) 132.

Although the switching circuits 170, 180, 190 and 200 are diagrammatically shown as switches in FIG. 5, they actually comprise a switching element such as a transistor. When the magnetic head 20 faces the burst pattern train 70, and after a code representing the start of a pattern is detected by a pattern detection circuit 146, the gate pulse generator 148 turns on the switching circuit 170, thereby outputting a signal corresponding to the burst pattern train 70 (hereinafter referred to as signal A). Also, the gate pulse generator 148 turns on only the switching circuit 180 when the magnetic head 20 faces the burst pattern train 80, thereby outputting a signal corresponding to the burst pattern train 80 (hereinafter referred to as signal B) from the switching circuit 180.

Similarly, the gate pulse generator 148 turns on only the switching circuit 190 when the magnetic head 20 faces the burst pattern train 90, thereby outputting a signal corresponding to the burst pattern train 90 (hereinafter referred to as signal C) from the switching circuit 190, and turns on only the switching circuit 200 when the magnetic head 20 faces the burst pattern train 100, thereby outputting a signal corresponding to the burst pattern train 100 (hereinafter referred to as signal D) from the switching circuit 200.

The other terminal of the switching circuit 170 branches into two signals, one connected to the signal input terminal of an analog/digital converter 134 (hereinafter referred to as an A/D converter), and the other connected to one of the two input terminals of an adder 136. The other terminal of the switching circuit 180 is connected to the second of the two input terminals of the adder 136. The signal output terminal of the adder 136 is connected to the reference signal input terminal of the A/D converter 134. As a consequence, the A/D converter 134 operates with a signal A+B as a reference signal. Signal A+B is obtained by adding the signal A output from the switching circuit 170 and the signal B output from the switching circuit 180. Thus, from the A/D converter 134, a signal A/(A+B) (hereinafter referred to as position detection signal SA) is output.

Also, the other terminal of the switching circuit 190 branches into two signals, one connected to the signal input terminal of an A/D converter 138, and the other connected to one of the two input terminals of an adder 140. The other terminal of the switching circuit 200 is connected to the second of the two input terminals of the adder 140. The signal output terminal of the adder 140 is connected to the reference signal input terminal of the A/D converter 138. Thus, the A/D converter 138 operates with a signal C+D as a reference signal. Signal C+D is obtained by adding the signal C output from the switching circuit 190 and the signal D output from the switching circuit 200. Accordingly, from the A/D converter 138, the signal C/(C+D) (hereinafter referred to as position detection signal SD) is output. The output terminals of the A/D converters 134 and 138 are connected to the MPU 132.

The MPU 132 determines the position of the magnetic head 20 based on the position detection signals SA and SD input from the A/D converters 134 and 138. Then, to move the magnetic head 20 to a predetermined position, the MPU 132 outputs data for driving the voice coil motor 126. This data is converted to an analog signal in a digital/analog converter (hereinafter referred to as a D/A converter) 142 connected to the MPU 132, amplified in an amplifier 144 connected to the D/A converter 142, and supplied to the voice coil motor 126. As a result, the voice coil motor 126 is driven to move the magnetic head 20 to the desired position.

Figure 8A:
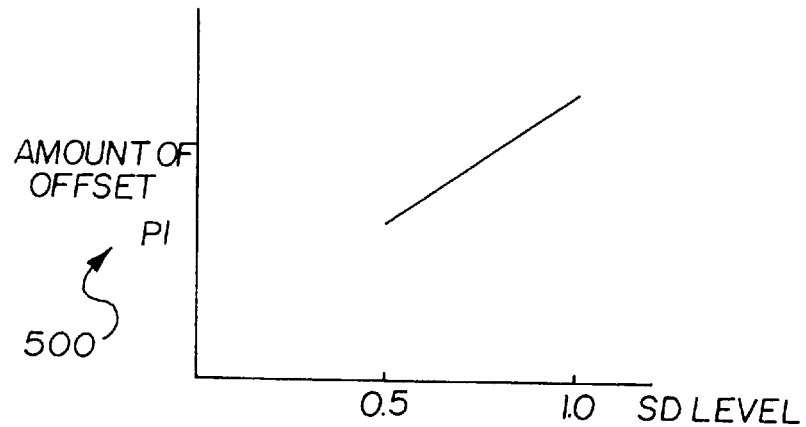
FIG. 8($a$) is a diagram showing the relationship of the signal level of the position detection signal SD vs. the amount of offset of the read gap of the magnetic head from the center of the data tracks in which the position detection signal SA decreases.
Figure 8B:
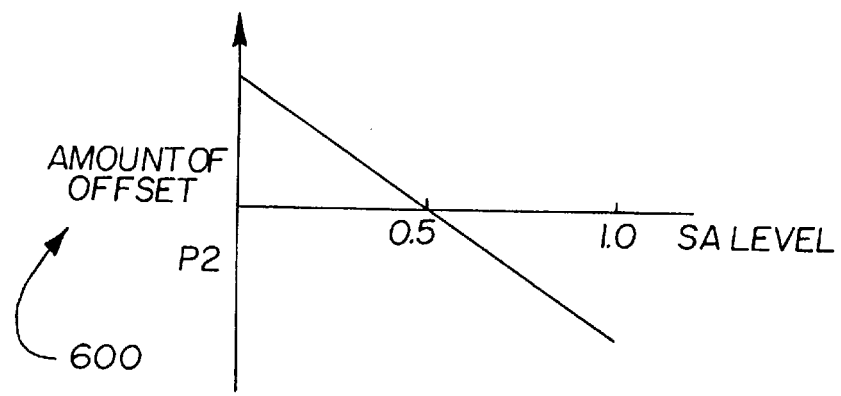
Figure 8C:
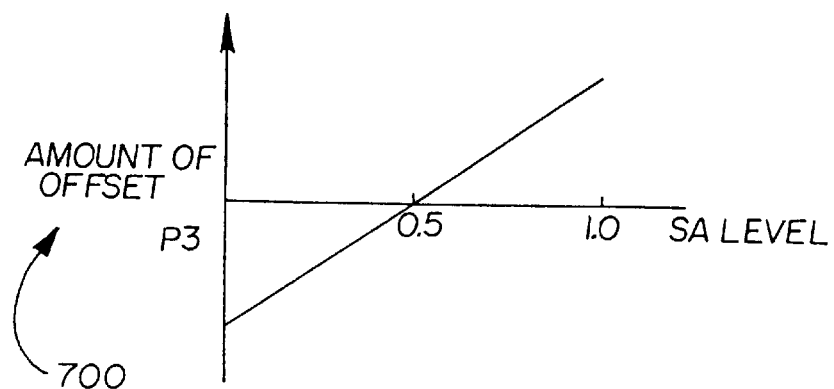
Figure 9:
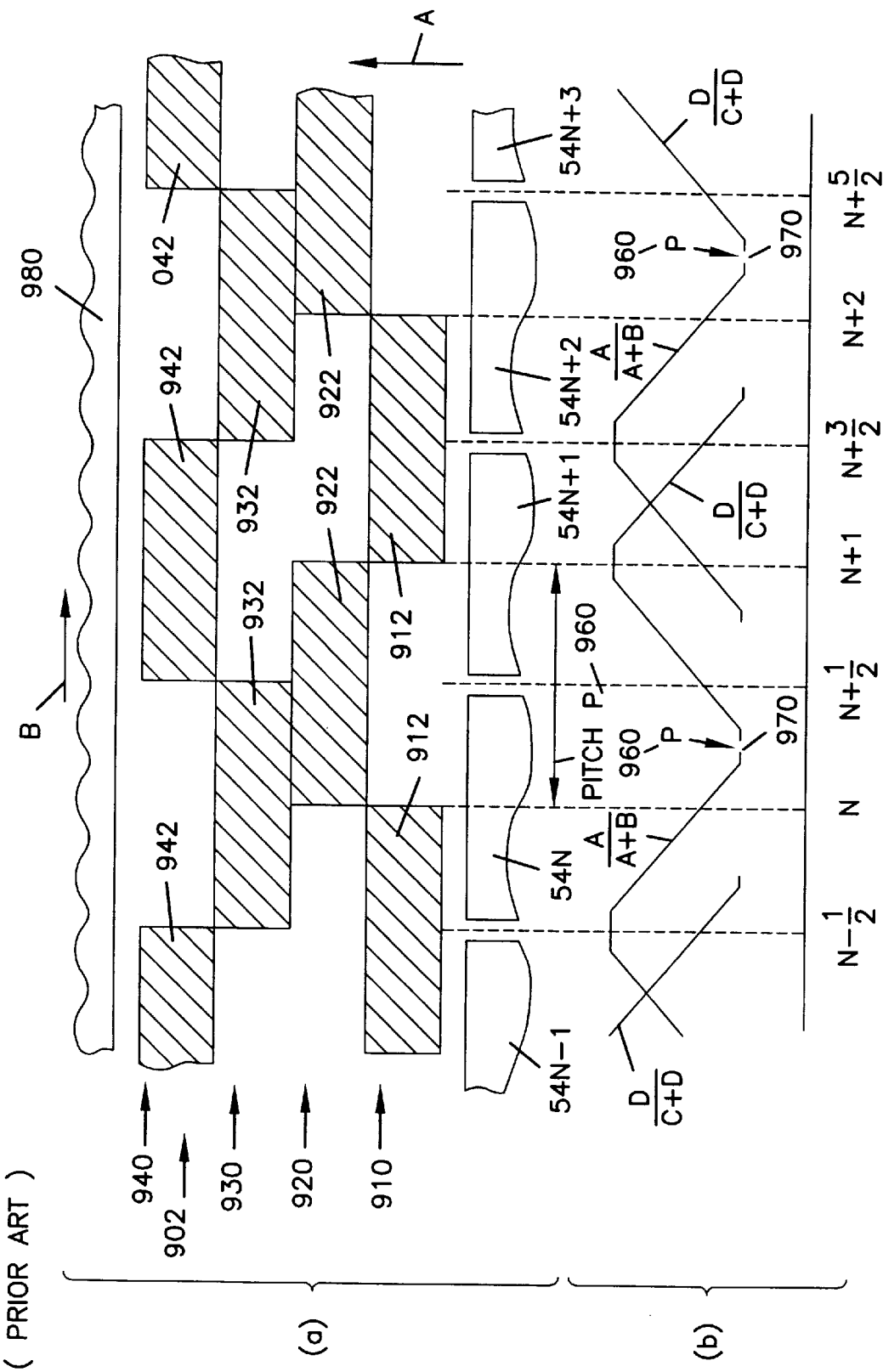
FIG. 9 is a plan view showing the conventional burst pattern and a diagram showing the signals output from the magnetic head when the burst pattern is read while the magnetic head is moved.

Further, a RAM (not shown) is included in the MPU 132, and the RAM stores, in the form of a map, the relationship of the signal level of the position detection signal SD vs. the amount of offset 500 of the read gap 20A of the magnetic head 20 from the center of data tracks on which the position detection signal SA is decreasing (e.g., data tracks 54N, 54N±2, 54N±4, . . . as shown in FIG. 8 (a)), the relationship of the signal level of the position detection signal SA vs. the amount of offset 600 of the read gap 20A of the magnetic head 20 from the center of the data tracks on which the position detection signal SA is decreasing (as shown in FIG. 8 (b)), and the relationship of the signal level of the position detection signal SA vs. the amount of offset 700 of the read gap 20A of the magnetic head 20 from the center of data tracks on which the position detection signal is increasing (e.g., data tracks 54N±1, 54N±3, . . . as shown in FIG. 8 (c)).

Figure 6:
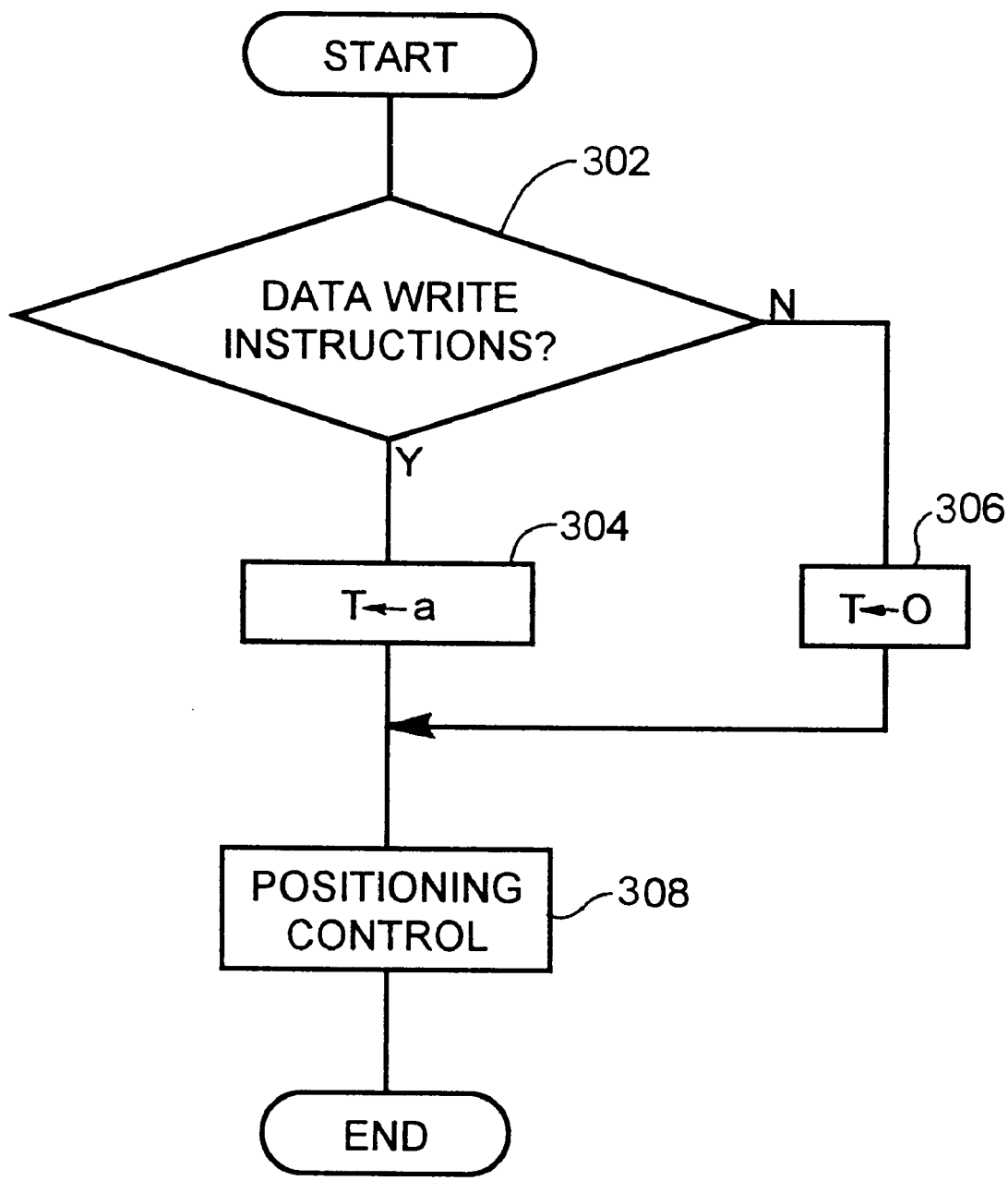
FIG. 6 is a flowchart showing the main routine of the present embodiment.

Now, the action of the present embodiment is described with reference to the flowcharts shown in FIGS. 6 and 7. The present embodiment is to perform positioning control of the magnetic head 20 when reading or writing data from or to the disk.

As shown in FIG. 3 (*a*), the side 76 of the data recording region 72 of the burst pattern train 70 is positioned at the center in the width direction of the data track 54N (54N±2, 54N±4, . . . ). Side 104 of the data recording region 102 of the burst pattern train 100 is disposed apart from the side 76 by a distance rather shorter than the read width of the read gap 20A.

Consequently, while the magnetic head 20 moves from the center the data track 54N in the direction of arrow B, the overlapping area between the read width of the read gap 20A of the magnetic head 20 and the data recording region 72 decreases. Further, the overlapping area between the read width and the data recording region 102 increases. Thus, as shown in FIG. 3 (*b*), the position detection signal SA decreases and the position detection signal SD increases. In this case, before the edge of the read width of the read gap 20A, which is opposite to the radial direction of the disk 18, passes the side 76 of the data recording region 72, the other edge of the read width passes the side 104 of the data recording region 102, and thus the position detection signal SD is detected before the detection of the position detection signal SA is discontinued.

Accordingly, the positioning of the magnetic head 20 to the center position of the data tracks 54N, 54N±2, 54N±4, . . . can be made reliably based on the position detection signal SA in the region from the edge of the data track 54N (54N±2, 54N±4, . . . ) in which the position detection signal SA is decreasing in the direction opposite to the radial direction of the disk 18, to half of the length of the read width of the read gap in the above direction from the center position of the data track in the above direction, and based on the position detection signal SD in the other regions.

In addition, the data recording regions 72 and 102 are disposed in the region corresponding to the radial direction side from the center of the data tracks 54N±1, 54N±3, . . . in the radial direction of the disk 18, and the recording region 102 is disposed in the opposite region and, thus, as shown in FIG. 3 (*b*), the detection of at least one of the position detection signals SA and SD is ensured. Consequently, on the data tracks 54N±1, 54N±3, . . . , the positioning of the magnetic head 20 to the center position of the data tracks 54N±1, 54N±3, . . . can be performed reliably based on at least one of the position detection signals SA and SD. In this embodiment, the positioning control of the magnetic head 20 is performed based on the signal levels of such position detection signals SA and SD.

In this embodiment, the positioning control of the magnetic head 20 is based on the signal levels of the position detection signals SA and SD. That is, at initiation, when the pattern detection circuit 146 detects the beginning of a pattern, and when instructions to read information from a predetermined data track of the disk 18 or to write information to the predetermined data track are input to the MPU 132 from the outside (e.g., the CPU of a computer connected to the hard disk device 10), whether or not, on the one hand, they are data write instructions is determined in step 302 (refer to FIG. 6). If so, the amount of offset 30 between the read gap 20A and the write gap 20B is set as the amount of correction T in step 304. Thereafter, the flow goes to step 308. On the other hand, for data read instructions, the amount of correction T is set to zero in step 306, and the processing flow goes to step 308.

In step 306, positioning control is performed. That is, gray code reading is performed in step 412 (refer to FIG. 7), and if the read gap 20A of the magnetic head 20 is positioned at substantially the center of the data track in the width direction, then, in step 414, it is determined from the track ID obtained from the gray code whether or not it is a track on which the value of the position detection signal SA decreases if the magnetic head 20 moves in the direction of arrow B. The tracks on which the value of the position detection signal SA decreases are tracks 54N, 54N±2, 54N±4 . . . in FIG. 3. The determination in step 118 is affirmative, the position detection signal is taken in step 416, and the flow goes to processing step 420.

In step 420, on the one hand, it is determined whether or not the take-in position detection signal is the position detection signal SA. If it is determined that the position detection signal SD was taken in, then, in step 122, based on the signal level of the taken position detection signal SD, the amount of offset 500 is taken in from the map of the signal level and the amount of offset 500 from the track center shown in FIG. 8 (*a*), and the processing flow goes to step 428.

On the other hand, if the determination in step 420 is affirmative, then, in step 424, based on the signal level of the taken-in position detection signal SA, the amount of offset 600 is taken in from the map of the signal level and the amount of offset 600 from the track center shown in FIG. 8 (*b*), and the processing flow goes to step 428.

Furthermore, if it is determined from the track ID that the magnetic head 20 is positioned at the tracks 54N–1, track N+1 . . . , the value of the data SA increases as the magnetic head 20 moves in the direction of arrow B. In this case, since the determination in step 414 was denied and the position detection signals SA and SD were input, either the position detection signal SA or the position detection signal SD (in this embodiment, position detection signal SA) is taken-in in step 418. Furthermore, in step 426, based on the signal level of the taken-in position detection signal SA, the amount of offset 700 is taken in from the map of the signal level and the amount of offset from the track center shown in FIG. 8 (*c*), and the processing flow goes to step 428.

In step 428, the amount of movement Q of the magnetic head 20 is obtained by adding the amount of correction T to one of the taken amounts 500, 600 and 700. In step 430, the voice coil motor 126 is driven, and in step 432, it is determined whether or not the magnetic head 20 moved by a distance Q. If the magnetic head 20 moved by the distance Q, then in step 434, the voice coil motor 126 is stopped, thereby completing the processing. Since the amount of movement Q of the magnetic head 20 is obtained by adding the amount of correction T to one of the amount of offset 500, 600 and 700, the amount of correction T is zero for data reading and the center of the read gap 20A can be positioned at the center of the data track, and since the amount of correction T is the amount of offset 30 for data writing, the center of the read gap 20A is positioned at a position offset from the center of the data track by the amount of offset 30, so that the center of the write gap 20B can be positioned at the center of the data track.

As shown in FIG. 3 (*a*), the side 76 of the data recording region 72 of the burst pattern train 70 is positioned at the center of the data track 54N (54N±2, 54N±4, . . . ) in the width direction, and the side 104 of the data recording region 102 of the burst pattern train 100 is disposed apart from the side 76 by a distance rather shorter than the length of the read width of the read gap 20A in the radial direction of the disk 18. Thus the position detection signal SD is detected before the detection of the position detection signal SA ceases. This allows the position detection signals SA and SD to be detected even in a region in which no position detection signal is detected in the prior art. Thus, a region where no position detection signal is detected does not occur and therefore the magnetic head 20 positioning can be performed reliably.

Since the occurrence of a region in which no position detection signal is detected can be prevented as described above, the crosstalk from other data tracks can be reduced by writing wide and reading narrow data with a magnetic head 20 in which the read width of the read gap is narrower than the write width of the write gap. Accordingly, this method provides a position detection signal having a small S/N ratio by increasing the recording density.

In the embodiment described above, the signal recording regions 72 and 92 are disposed so as to overlap the signal recording regions 82 and 102 by an amount of three-fifths in the direction of the rotation of the disk 18, respectively. However, this relationship is not meant to limit the present invention. Other embodiments may be used without departing from the teaching of the present invention. Other designs which provide the side 76 of the data recording region 72 and the side 104 of the data recording region 102 disposed apart from each other by a distance not greater than the read width of the read gap 20A are possible.

Further, in the embodiment described above, the side 76 of the data recording region 72 of the burst pattern train 70 is positioned at the center of the data tracks 54N (54N±2, 54N±4, . . . ) in the width direction, and the side 76 of the data recording region 102 of the burst pattern train D is disposed apart from the side 76 by a distance rather shorter than the length of the read width of the read gap 20A in the radial direction of the disk 18. However, the present invention is not meant to be limited by this description. For example, the data recording region 92 of the burst pattern train 90 may be disposed at a position corresponding to the data recording region 102, and the data recording region 102 of the burst pattern train 100 may be disposed at a position corresponding to the data recording region 92. In this case, the data tracks in which the position detection signal SA decreases shift to the data tracks 50N±1, 50N±3, . . . . Thus, other embodiments which perform position control are possible without departing from the teaching of the invention.

Furthermore, in the embodiment described above, an example has been described in which the magnetic head is moved relative to the disk. However, the present invention is not meant to be limited to this. The present invention is also applicable to examples where the disk is moved relative to the magnetic head, or to examples where the disk and the magnetic head are moved relative to each other.

Moreover, in the embodiment described above, the description has been made by taking as an example a magnetic disk such as a hard disk or flexible disk as the magnetic recording medium. Again, the present invention is not meant to be limited to this configuration. The invention may also be applied to a magnetic recording medium such as a magnetic tape.

In summary, the present invention provides a plurality of data tracks formed on a magnetic recording medium. Data is written on the magnetic recording medium by a magnetic head having a write section of a predetermined write width and a read section of a read width shorter than the write width. The write and read sections are spaced apart by a predetermined distance, and first to fourth burst patterns are recorded on the magnetic recording medium.

The first burst pattern is formed by arranging in the predetermined direction a plurality of record sections which are formed by recording data in every other one of the regions defined by a first side disposed so as to correspond to the vicinity of the center of the data track and a second side opposed to the first side and disposed so as to correspond to the vicinity of the center of the data tracks adjacent to the data track.

The second burst pattern is formed by arranging in the predetermined direction a plurality of record sections which are formed by recording data in the regions corresponding to those of the first burst pattern in which no data is recorded, and disposed in parallel with the first burst pattern.

The third burst pattern is formed by arranging in the predetermined direction a plurality of record sections which are formed by recording data in every other one of the regions defined by a third side space apart from the first side of the first burst pattern by a distance not greater than the read width and a fourth side opposed to the third side and spaced apart from the second side by a distance not greater than the read width, and disposed in parallel with the first burst pattern.

The fourth burst pattern is formed by arranging in the predetermined direction a plurality of record sections which are formed by recording data in the regions corresponding to those of the third burst pattern in which no data is recorded, and disposed in parallel with the first burst pattern.

To perform head positioning control for the magnetic recording medium, for instance, the head is positioned at the desired location based on a signal which is output from the magnetic head corresponding to at least either the first and second burst patterns or the third and fourth burst patterns, with at least either the magnetic head or the magnetic recording medium is moved relatively in the predetermined direction.

Accordingly, the read width of the read section of the magnetic head is positioned at the third side before passing the first side, with at least one of the magnetic head and the magnetic recording medium being in relative motion. The read width is positioned at the fourth side before passing the second side.

Thus, the read section of the magnetic head can reliably detect at least either the first and second burst patterns or the third and fourth burst patterns.

This can reliably prevent the occurrence of a region in which there is no detection of the signal which is output from the magnetic head corresponding to the first and second burst patterns and the third and fourth burst patterns, whereby the magnetic head can be positioned reliably.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A radial positional data track for accurately positioning a magnetic head relative to a magnetic recording medium, the magnetic head having a read gap and write gap, the read gap being shorter than the write gap, the radial positional data track comprising:

a first periodic radial data structure having a first period, for generating a first signal for positioning a magnetic head relative to the recording medium; and a second periodic radial data structure, parallel and offset from the first data structure by less than one-fourth of the first period, by a distance not greater than the read gap, for generating a second head position signal, wherein the second head position signal is detected before the first head position signal becomes undetectable.

2. The radial positional data track of claim 1 wherein the first radial data structure comprises a first burst pattern formed by a plurality of radial record regions, data being recorded in every other one of the regions and a second burst pattern formed by a plurality of radial regions parallel and adjacent to the first burst pattern, data being recorded in the regions corresponding to those of the first burst pattern in which no data is recorded; and wherein the second radial data structure comprises a third burst pattern formed by a plurality of radial record regions parallel to and adjacent to the second burst pattern, data being recorded in every other one of the regions defined by a third side spaced apart from the regions of the first burst pattern having data therein by a distance not greater than the read gap and a fourth burst pattern formed by a plurality of radial record regions parallel and adjacent to the third burst pattern, data being recorded in the regions corresponding to those of the third burst pattern in which no data is recorded.

3. The radial positional data track of claim 2 wherein the first and second radial data structures are disposed among concentric data tracks;

wherein the first burst pattern is further defined by a first side centrally aligned with a concentric data track and a second side opposed to the first side and centrally aligned with an adjacent concentric data track; and wherein the third burst pattern is further defined by a third side spaced apart from the first side for the first burst pattern by a distance not greater than the read width and a fourth side opposed to the third side and spaced apart from the second side by a distance not greater than the read width.

4. The radial positional data track of claim 2 wherein the burst patterns further comprise a special code representing the start of the pattern and a gray code representing the address of the corresponding data track.

5. The radial positional data track of claim 4 wherein the special code comprises a silent region of about one microsecond and the gray code comprises a cyclic binary code.

6. The radial positional data track of claim 1 wherein the magnetic head further comprises a magnetoresistance read element and a coil write element.

7. A magnetic recording medium for accurately positioning magnetic write and read heads relative to the medium, comprising:

a first periodic burst pattern having a first period, formed by a plurality of radial record regions, data being recorded in every other one of the regions by a magnetic head having a read gap and write gap, the read gap being shorter than the write gap;

a second burst pattern formed by a plurality of radial regions parallel and adjacent to the first periodic burst pattern, data being recorded in the regions corresponding to those of the first burst pattern in which no data is recorded;

a third periodic burst pattern formed by a plurality of radial record regions parallel to and adjacent to the second burst pattern, data being recorded in every other one of the regions defined by a third side spaced apart from the regions of the first periodic burst pattern having data therein by less than one-fourth of the first period, by a distance not greater than the read gap; and a fourth burst pattern formed by a plurality of radial record regions parallel and adjacent to the third periodic burst pattern, data being recorded in the regions corresponding to those of the third periodic burst pattern in which no data is recorded;

wherein a first head position signal is obtained from the first and second burst pattern and a second head position signal is obtained from the third and fourth burst pattern, the second position detection signal being detected before the detection of the position detection signal ceases.

8. The medium of claim 7 wherein the first and second radial data structures are disposed among concentric data tracks, the first burst pattern being further defined by a first side centrally aligned with a concentric data track and a second side opposed to the first side and centrally aligned with an adjacent concentric data track, and the third burst pattern being further defined by a third side spaced apart from the first side for the first burst pattern by a distance not greater than the read width and a fourth side opposed to the third side and spaced apart from the second side by a distance not greater than the read width.

9. The disk drive of claim 8 wherein the burst patterns further comprise a special code representing the start of the pattern and a gray code representing the address of the corresponding data track.

10. The disk drive of claim 9 wherein the special code comprises a silent region of about one microsecond and the gray code comprises a cyclic binary code.

11. The disk drive of claim 7 wherein the magnetic head further comprises a magnetoresistance read element and a coil write element.

12. A disk drive system, comprising:

a shaft having at least one disk disposed thereon;

a shaft driving device, coupled to the shaft, for rotating the shaft and disks;

a magnetic head, coupled to the disks, for reading and writing data on the disks;

the disks further comprising a first periodic radial data structure having a first period, for generating a first signal for positioning a head relative to the disks and a second periodic radial data structure, parallel and offset from the first periodic data structure by less than one-fourth of the first period, by a distance not greater than the read gap, for generating a second head position signal, wherein the second head position signal is detected before the first head position signal becomes undetectable; and positioning means, coupled to the head, for generating a head movement control signal for positioning the magnetic head at a desired location in response to the first and second head position signal.

13. The disk drive of claim 12 further comprising movement means for moving relatively at least either the magnetic head or the disk in predetermined direction in response to the head movement control signal.

14. The disk drive of claim 13 wherein the movement means moves the magnetic head relative to the magnetic recording medium.

15. The disk drive of claim 13 wherein the movement means moves the magnetic recording medium relative to the magnetic head.

16. The disk drive of claim 12 wherein the magnetic head comprises a write section of a predetermined write width and a read section of a read width shorter than the write width.

17. The disk drive of claim 16 wherein the write and read sections are spaced apart by a predetermined distance.

18. The disk drive of claim 12 wherein the disks further comprise a plurality of data tracks concentrically formed at a pitch in the radial direction, and wherein the first and second radial data structures comprise data recorded in a predetermined pattern to form a plurality of burst patterns of data recorded regions.

19. The disk drive of claim 18 wherein each data recorded region has a length in the radial direction of the magnetic disk and a spacing between the adjacent regions equal to the pitch of the data track.

20. The disk drive of claim 19 wherein the first radial data structure comprises a first burst pattern train of radial record sections, the regions having data recorded therein defined by a first side disposed so as to be positioned at the center of alternating concentric data tracks and a second side opposed to the first side and disposed at the center of complimentary concentric data tracks, and a second burst pattern train of radial record sections, parallel and adjacent to the first, the regions having data recorded therein corresponding to those of the first burst pattern train in which no data is recorded; and wherein the second radial data structure comprises a third burst pattern train of radial record sections having data recorded therein, the regions having data recorded in the regions defined by a third side spaced apart from the first side of the first burst pattern train by a distance shorter than the read width of the read gap and a fourth side opposed to the third side and spaced apart from the third side by a distance shorter than the read width of the read gap, and a fourth burst pattern train of radial record sections having data recorded in the regions corresponding to those of the third burst pattern train in which no data is recorded.

21. The disk drive of claim 20 wherein the burst pattern trains further comprise a special code representing the start of the pattern and a gray code representing the address of the corresponding data track.

22. The disk drive of claim 21 wherein the special code comprises a silent region of about one microsecond and the gray code comprises a cyclic binary code.

23. The disk drive of claim 12 wherein the magnetic head further comprises a magnetoresistance read element and a coil write element.

24. A method for accurately positioning magnetic write and read heads relative to a magnetic recording medium, comprising the steps of:

positioning a magnetic head relative to a magnetic recording medium, the magnetic head having a read gap and write gap, the read gap being shorter than the write gap;

creating a first periodic radial data structure having a first period, for generating a first signal for positioning a head over data tracks on a recording medium;

creating a second periodic radial data structure, parallel and offset from the first data structure by less than one-fourth of the first period, by a distance not greater than the read gap, for generating a second head position signal; and detecting the second head position signal before the first head position signal becomes undetectable.

25. The method of claim 24 wherein the step of creating a first radial data structure further comprises the steps of:

creating a first burst pattern formed by a plurality of radial record regions, data being recorded in every other one of the regions; and creating a second burst pattern formed by a plurality of radial regions parallel and adjacent to the first burst pattern, data being recorded in the regions corresponding to those of the first burst pattern in which no data is recorded.

26. The method of claim 25 wherein the step of creating a second radial data structure further comprises the steps of:

creating a third burst pattern formed by a plurality of radial record regions parallel to and adjacent to the second burst pattern, data being recorded in every other one of the regions defined by a third side spaced apart from the regions of the first first burst pattern having data therein by a distance not greater than the read gap; and creating a fourth burst pattern formed by a plurality of radial record regions parallel and adjacent to the third burst pattern, data being recorded in the regions corresponding to those of the third burst pattern in which no data is recorded.

27. The method of claim 26 further comprising the steps of:

detecting when the first position detection signal corresponding to the first and second burst pattern decreases and the second position detection signal from the third and fourth burst pattern increases;

outputting a signal from the magnetic head correspondingly to at least either the first and second burst patterns or the third and fourth burst patterns.

28. The method of claim 27 wherein the step of detecting further comprises the step of passing a leading edge of the read width past the first side of a radial record region in the third burst pattern before the trailing edge of the read width of the read gap passes the second side of the corresponding radial record region in the first burst pattern.

29. A magnetic head positioning method comprising the steps of:

creating a first periodic burst pattern having a first period, by arranging in said predetermined direction a plurality of record sections which are formed by recording data in every other one of the regions defined by a first side centrally disposed so as to correspond to the vicinity of a first concentric data track and a second side opposed to said first side and centrally disposed so as to correspond to the vicinity of a second concentric data track adjacent to said first concentric data track;

creating a second burst pattern formed by arranging in said predetermined direction a plurality of record sections which are formed by recording data in the regions corresponding to those of said first burst pattern in which no data is recorded, said second burst pattern being disposed in parallel with said first burst pattern;

creating a third periodic burst pattern formed by arranging in said predetermined direction a plurality of record sections which are formed by recording data in every other one of the regions defined by a third side spaced apart from said first side of said first periodic burst pattern by less than one-fourth of the first period, by a distance not greater than said read width and a fourth side opposed to said third side and spaced apart from said second side by a distance not greater than said read width, said third burst pattern being disposed in parallel with said first burst pattern;

creating a fourth burst pattern formed by arranging in said predetermined direction a plurality of record sections which are formed by recording data in the regions corresponding to those of said third periodic burst pattern in which no data is recorded, said fourth burst pattern being disposed in parallel with said first pattern;

moving relatively in a predetermined direction at least either a magnetic head or a magnetic recording medium, said magnetic head including a write section of a predetermined write width and a read section of a read width shorter than said write width, said write and read sections being spaced apart by a predetermined distance; and positioning said magnetic head at the desired location based on a signal which is output from said magnetic head corresponding to at least either said first and second burst patterns or said third and fourth burst patterns.

* * * * *

UNITED STATES PATENT AND TRADEMARK OFFICE
CERTIFICATE OF CORRECTION

PATENT NO. : 5,905,603
DATED : May 18, 1999
INVENTOR(S) : Ogasawara et al.

It is certified that error appears in the above-identified patent and that said Letters Patent is hereby corrected as shown below:

<u>Title page,</u>
Item [56], U.S. PATENT DOCUMENTS, add the following:

| | | | |
|---|---|---|---|
| -- 5,596,463, | 1/97, | Hashimoto, | 360/77.08 -- |
| -- 5,434,733, | 7/95, | Hesterman et al., | 360/113 -- |
| -- 5,619,387, | 4/97, | Ottesen et al., | 360/77.08 -- |
| -- 5,436,773, | 7/95, | Hanson, | 360/77.08 -- |
| -- 5,274,510 | 12/93, | Sugita et al., | 360/77.08 -- |
| -- 5,587,850 | 12/96, | Ton-that, | 360/77.08 --; |

Item [30], Foreign Application Priority Data, please replace "6-3058757" with -- 6-231912 --.

Signed and Sealed this

Eighth Day of April, 2003

JAMES E. ROGAN
*Director of the United States Patent and Trademark Office*